US011726856B2

(12) United States Patent
Thakkar et al.

(10) Patent No.: US 11,726,856 B2
(45) Date of Patent: Aug. 15, 2023

(54) SYSTEMS AND METHODS FOR IDENTIFICATION OF ISSUE RESOLUTIONS USING COLLABORATIVE FILTERING

(71) Applicant: Dell Products, L.P., Round Rock, TX (US)

(72) Inventors: Bina K. Thakkar, Cary, NC (US); Deepak Nagarajegowda, Cary, NC (US); Ashutosh P. Nanekar, Cary, NC (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/468,894

(22) Filed: Sep. 8, 2021

(65) Prior Publication Data

US 2023/0073644 A1 Mar. 9, 2023

(51) Int. Cl.
G06F 11/07 (2006.01)
(52) U.S. Cl.
CPC ...... G06F 11/0781 (2013.01); G06F 11/0709 (2013.01); G06F 11/079 (2013.01)
(58) Field of Classification Search
CPC ............. G06F 11/0781; G06F 11/0709; G06F 11/079; G06F 11/3075
See application file for complete search history.

(56) References Cited

U.S. PATENT DOCUMENTS 9,171,000 B2\* 10/2015 Glass ................. G06Q 30/0282
2020/0119971 A1\* 4/2020 Healey ................ G06F 11/3058

\* cited by examiner

*Primary Examiner* — Joseph R Kudirka
(74) *Attorney, Agent, or Firm* — Fogarty LLP (57) ABSTRACT

Systems and methods are provided for providing recommended resolutions to issues occurring during operation of an Information Handling System (IHS). Similar issues, each associated with resolution information specifying one or more recommended resolutions, are identified within an issue repository. Collaborative filtering is utilized on the similar issues and associated resolution information to generate a first ranked list. Collaborative filtering is also utilized on a subset of the similar issues and associated resolution information to generate a second ranked list of the subset of similar issues and associated resolution information, where the subset of similar issues are each selected based on being within a time proximity to the reported issue. A linear regression is utilized on the first ranked list and the second ranked list to generate a ranked list of recommended resolutions to the reported issue that is then provided to an administrator.

20 Claims, 4 Drawing Sheets

SYSTEMS AND METHODS FOR IDENTIFICATION OF ISSUE RESOLUTIONS USING COLLABORATIVE FILTERING

FIELD

The present disclosure generally relates to Information Handling Systems (IHSs), and, more particularly, to resolving technical issues occurring in IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as enterprise blade servers that are stacked and installed within racks. A data center may include large numbers of such server racks that are organized into rows of racks. Administration of such large groups of IHSs may require teams of remote and local administrators working in shifts in order to support around-the-clock availability of the data center operations while minimizing downtime. Identifying and resolving technical issues in such an environment is challenging. Each IHS may generate various streams of telemetry, logs and other data that may be used to diagnose issues within that particular IHS or in another IHS. Administrators may utilize the data collected by telemetry and logging systems in diagnosing errors or other issues of interest related to an IHS. In some instances, however, correctly diagnosing an issue using this data may require an administrator spending many hours in evaluating the configuration of an IHS, understanding the configuration of other data center elements that interface with the IHS and in analyzing generated telemetry and log data.

SUMMARY

In various embodiments, methods are provided that may include: receiving a report of an issue occurring during operation of an Information Handling System (IHS); identifying similar issues to the reported issue within a repository of stored issues reported by IHSs installed in a plurality of datacenters, wherein the identified similar issues are each associated with resolution information specifying one or more recommended resolutions; utilizing collaborative filtering on the similar issues and associated resolution information to generate a first ranked list of the similar issues and associated resolution information; utilizing collaborative filtering on a subset of the similar issues and associated resolution information to generate a second ranked list of the subset of similar issues and associated resolution information, wherein the subset of similar issues are each selected based on being within a time proximity to the reported issue; utilizing a linear regression on the first ranked list and the second ranked list to generate a ranked list of recommended resolutions to the reported issue; and providing the ranked list of recommended resolutions to an administrator.

In some method embodiments, the similar issues are identified based on a similarity between a vectorized representation of the reported issue and vectorized representations of issues stored in the repository. In some method embodiments, the similarity to the reported issues is identified based on a cosine similarity between the vectorized representations. In some method embodiments, the resolution information associated with the similar issues comprises feedback received from an administrator pertaining to a recommended resolution. In some method embodiments, the feedback specifies whether the recommended resolution was accepted or rejected by the administrator. Some method embodiments may further include generating a third ranked list of the similar issues and associated resolution information, wherein the third ranked list specifies an ordered list of quickest resolutions to the reported issue, and wherein the linear regression further utilizes the third ranked list to generate the ranked list of recommended resolutions to the reported issue. Some method embodiments may further include generating a fourth ranked list of the similar issues and associated resolution information, wherein the fourth ranked list specifies an ordered list of least expensive resolutions to the reported issue, and wherein the linear regression further utilizes the fourth ranked list to generate the ranked list of recommended resolutions to the reported issue. Some method embodiments may further include generating a fifth ranked list of the similar issues and associated resolution information, wherein the fifth ranked list specifies an ordered list that is ranked based on feedback provided by an administrator to the associated resolution information. In some method embodiments, the first ranked list generated by collaborative filtering is ranked based on the recommendation information associated with the similar issues.

In various additional embodiments, systems are provided that may include: a repository of stored issues reported by IHSs (Information Handling Systems) installed in a plurality of datacenters; and an administrative software tool provided for management of the IHSs installed in the plurality of datacenters, wherein the tool is configured to: receive a report of an issue occurring during operation of a first of the IHSs; identify similar issues to the reported issue within the repository, wherein the identified similar issues are each associated with resolution information specifying one or more recommended resolutions; utilize collaborative filtering on the similar issues and associated resolution information to generate a first ranked list of the similar issues and associated resolution information; utilize collaborative filtering on a subset of the similar issues and associated resolution information to generate a second ranked list of the subset of similar issues and associated resolution information, wherein the subset of similar issues are each selected based on being within a time proximity to the reported issue; utilize a linear regression on the first ranked list and the second ranked list to generate a ranked list of recommended resolutions to the reported issue; and provide the ranked list of recommended resolutions to an administrator.

In some system embodiments, the similar issues are identified based on a similarity between a vectorized representation of the reported issue and vectorized representations of issues stored in the repository. In some system embodiments, the similarity to the reported issues is identified based on a cosine similarity between the vectorized representations. In some system embodiments, the resolution information associated with the similar issues comprises feedback received from an administrator pertaining to a recommended resolution. In some system embodiments, the feedback specifies whether the recommended resolution was accepted or rejected by the administrator. In some system embodiments, the first ranked list generated by collaborative filtering is ranked based on the recommendation information associated with the similar issues.

In various additional embodiments, computer-readable storage devices are provided that include instructions stored thereon for management of the IHSs installed in the plurality of datacenters (Information Handling Systems), wherein execution of the instructions by one or more processors causes the one or more processors to: receive a report of an issue occurring during operation of a first of the IHSs; identify similar issues to the reported issue within the repository of stored issues reported by the IHSs installed in the plurality of datacenters, wherein the identified similar issues are each associated with resolution information specifying one or more recommended resolutions; utilize collaborative filtering on the similar issues and associated resolution information to generate a first ranked list of the similar issues and associated resolution information; utilize collaborative filtering on a subset of the similar issues and associated resolution information to generate a second ranked list of the subset of similar issues and associated resolution information, wherein the subset of similar issues are each selected based on being within a time proximity to the reported issue; utilize a linear regression on the first ranked list and the second ranked list to generate a ranked list of recommended resolutions to the reported issue; and provide the ranked list of recommended resolutions to an administrator.

In some storage device embodiments, the similar issues are identified based on a similarity between a vectorized representation of the reported issue and vectorized representations of issues stored in the repository. In some storage device embodiments, the similarity to the reported issues is identified based on a cosine similarity between the vectorized representations. In some storage device embodiments, the resolution information associated with the similar issues comprises feedback received from an administrator pertaining to a recommended resolution. In some storage device embodiments, the feedback specifies whether the recommended resolution was accepted or rejected by the administrator.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
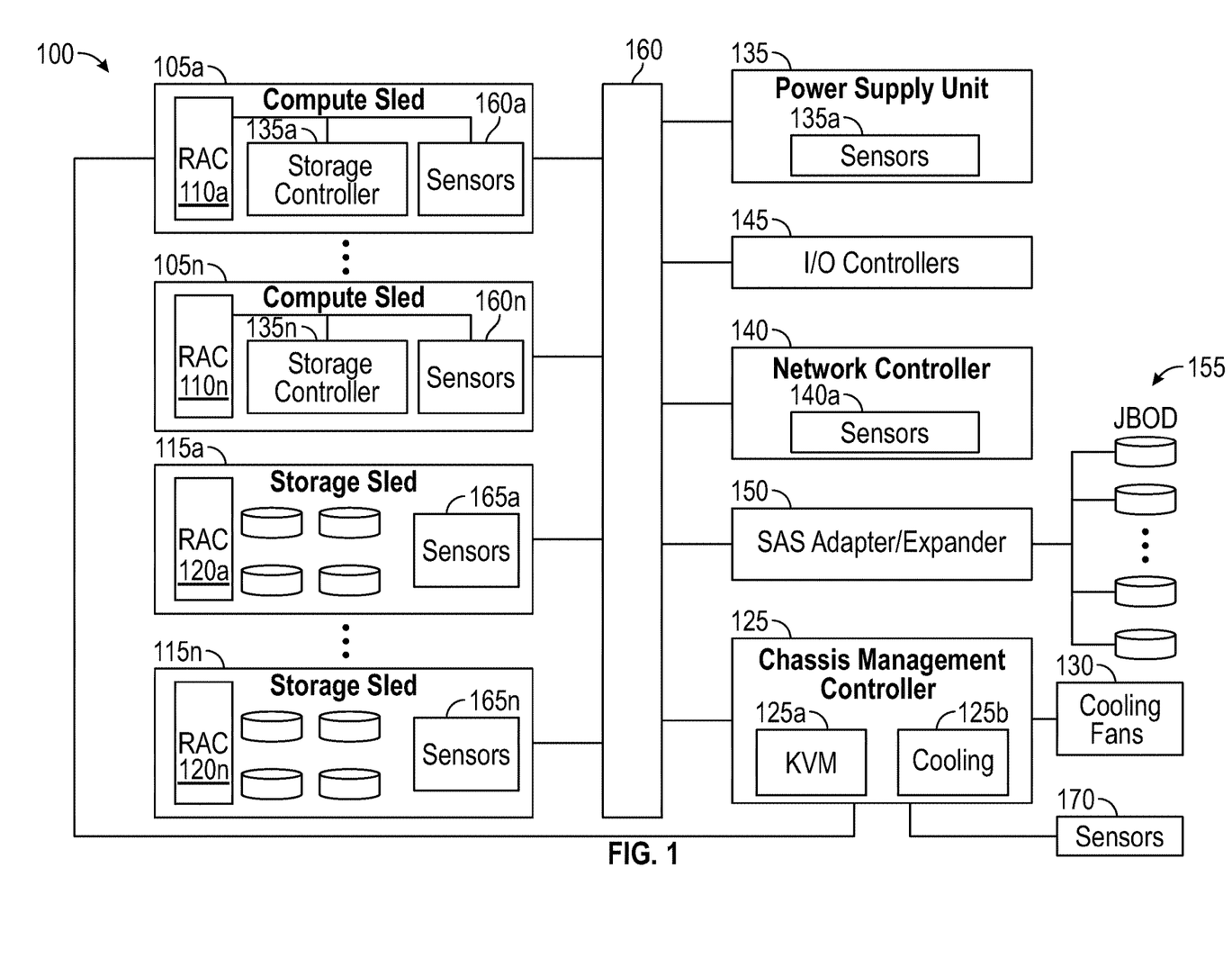
FIG. 1 is a diagram illustrating certain components of a chassis, according to some embodiments, for use of collaborative filtering in identifying resolutions for issues occurring within components of the chassis.

FIG. 1 is a block diagram illustrating certain components of a chassis 100 comprising one or more compute sleds 105a-n and one or more storage sleds 115a-n that may be configured to implement the systems and methods described herein for use of collaborative filtering in identifying resolutions for issues occurring within components of the chassis 100. Chassis 100 may include one or more bays that each receive an individual sled (that may be additionally or alternatively referred to as a tray, blade, server, drive and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the ongoing operations of the other sleds installed in the chassis 100.

Multiple chassis 100 are typically housed within a rack, with each chassis installed in one or more slots of the rack. Data centers may utilize large numbers of racks, with various different types of chassis installed in the various rack configurations. The modular architecture provided by the sleds, chassis and rack allow for certain resources, such as cooling, power and network bandwidth, to be shared by the compute sleds 105a-n and storage sleds 115a-n, thus providing efficiency and supporting various types of computational loads.

Chassis 100 may be installed within a rack that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n that are installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to connectors provided by front-facing bays of the chassis 100, where these connectors physically and electrically couple an individual sled to a backplane 160 of the chassis, where the backplane may be additionally or alternatively be referred to as a midplane. Chassis backplane 160 may be a printed circuit board that includes electrical traces and connectors that are configured to route signals between components of chassis 100 that are connected to the backplane 160. In various embodiments, backplane 160 may include various additional components, such as cables, wires, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135.

Figure 2:
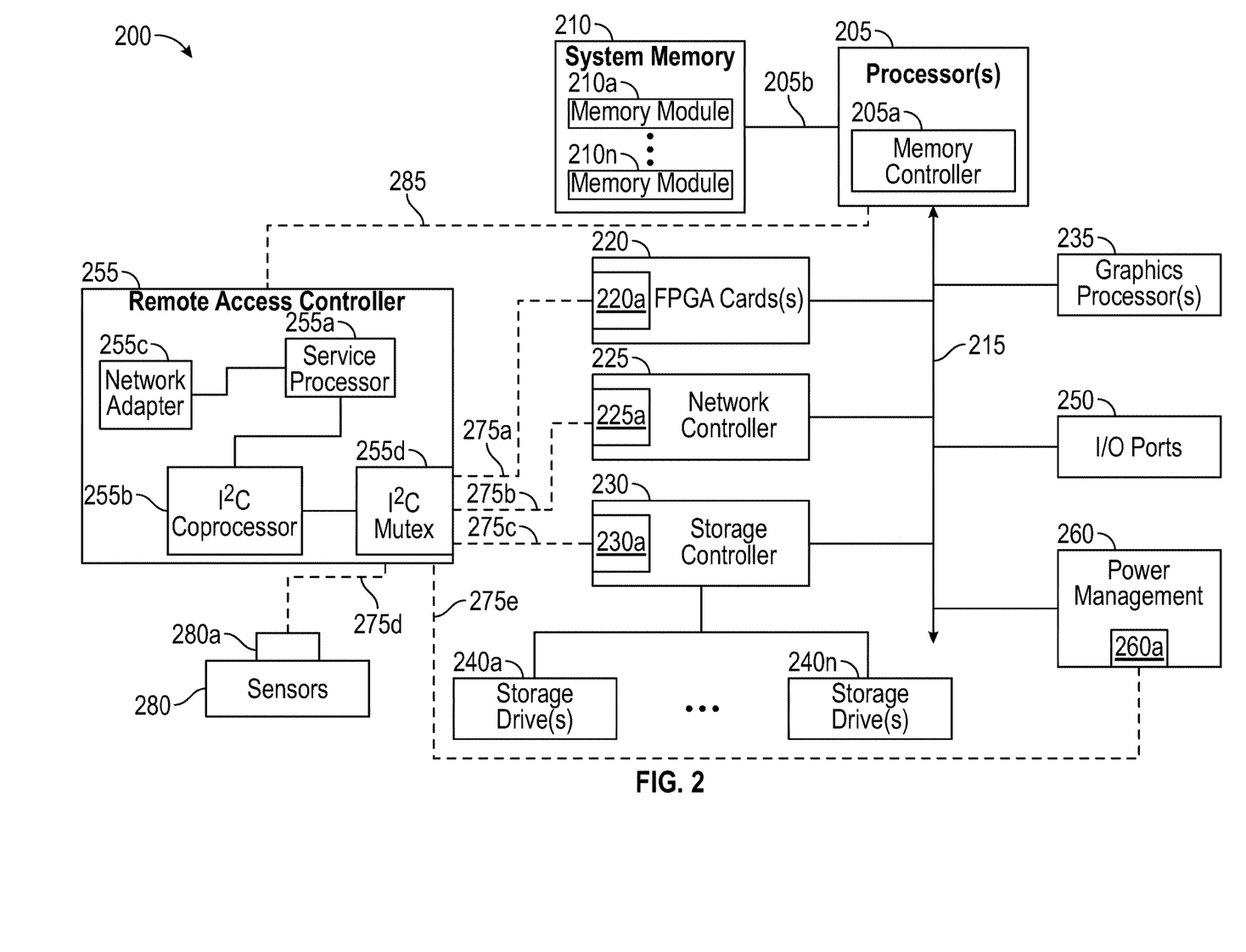
FIG. 2 is a diagram illustrating certain components of an IHS configured as a component of chassis, according to some embodiments, for use of collaborative filtering in identifying resolutions for issues occurring within the IHS.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

As illustrated, each compute sled 105a-n includes a remote access controller (RAC) 110a-n. As described in additional detail with regard to FIG. 2, each remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. As illustrated, each compute sled 105a-n may include one or more sensors 160a-n that may generate various types of telemetry data that characterizes aspects of the operation of a respective compute sled 105a-n. For instance, sensors 160a-n may generate and/or collect telemetry data characterizing the performance of processing, networking, power and/or memory components of a compute sled 105a-n, as well as telemetry data from monitoring environmental properties, such as compute sled temperatures. Based on data generated by sensors 160a-n, various types of error conditions, warning messages, status updates, health information and other outputs may be generated and may eventually result in a technical issue being presented to an administrator, such as through a message provided in an administrative user interface used in data center management. As described in additional detail below, remote access controller 110a-n may identify such technical issues within the generated telemetry data, such as via sideband management signaling pathways utilized by the remote access controller. The remote access controller 110a-n may report identified issues for storage in an issue repository for use in identifying resolutions to technical issues, whether occurring in chassis 100, or in other chassis that may be located in the same or different data center as chassis 100.

Each of the compute sleds 105a-n includes a storage controller 135a-n that may be utilized to access storage drives that are accessible via chassis 100. Some of the individual storage controllers 135a-n may provide support for RAID (Redundant Array of Independent Disks) configurations of logical and physical storage drives, such as storage drives provided by storage sleds 115a-n. In some embodiments, some or all of the individual storage controllers 135a-n may be HBAs (Host Bus Adapters) that provide more limited capabilities in accessing physical storage drives provided via storage sleds 115a-n and/or via SAS expander 150.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100. As illustrated, each storage sled 115a-n may include one or more sensors 165a-n. The sensors 165a-n may generate various types of telemetry data that characterize aspects of the operation of a respective storage sled 115a-n. For instance, sensors 165a-n may generate and/or collect telemetry data characterizing the performance of a storage sled 115a-n, such as data transfer rates and hard disk drive RPMs, as well as telemetry data from monitoring environmental properties, such as storage sled temperatures. Based on data generated by sensors 165a-n, various types of error conditions, warning messages, status updates, health information and other outputs may be generated and may eventually result in a technical issue being presented to an administrator. Remote access controller 120a-n may identify such technical issues within the generated telemetry data, such as via sideband management signaling pathways utilized by the remote access controller. The remote access controller 120a-n may report identified issues for storage in an issue repository for use in identifying resolutions to technical issues, whether occurring in chassis 100, or in other chassis that may be located in the same or different data center as chassis 100.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located. In some instances, each of the storage drives and the SAS expander may generate telemetry and/or error data that may be reported to a chassis management controller 125. As described in additional detail below, in some embodiments, a chassis management controller 125 may report technical issues identified in the telemetry and error data for use in identifying resolutions to these issues reported as occurring in chassis 100, or in other chassis.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. As with compute sleds 105*a-n* and storage sleds 115*a-n*, network controller 140 may include one or more sensors 140*a* that may include physical sensors, such as a temperature sensor providing thermal metrics, and logical sensors, such as capabilities reporting metrics of input and output data transfer rates. As with the sensors of compute sleds 105*a-n* and storage sleds 115*a-n*, the sensors 140*a* of network controller 140 may be configured to generate and report this telemetry data. In some instances, network controller 140 may generate telemetry and/or error data from which technical issues may be identified by chassis management controller 125 and stored in a repository, for use in identifying resolutions for these issues in chassis 100 or in other chassis.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that provides chassis 100 with redundant, hot-swappable power supply units. As illustrated, power supply unit 135 may include one or more sensors 135*a* that may include physical sensors, such as a temperature sensor providing thermal and power output metrics, and logical sensors, such as capabilities that report discrete power settings. As above, the sensors 135*a* of power supply unit 135 may be configured to generate and report telemetry data and/or error data, from which chassis management controller 125 may identify technical issues which are reported to a repository for use in identifying resolutions for errors in chassis 100 and in other chassis.

Chassis 100 may also include various I/O controllers 140 that may support various I/O ports, such as USB ports that may be used to support keyboard and mouse inputs and/or video display capabilities. Such I/O controllers 145 may be utilized by a chassis management controller 125 to support various KVM (Keyboard, Video and Mouse) 125*a* capabilities that provide administrators with the ability to interface with the chassis 100. In addition to providing support for KVM 125*a* capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125*b* of the chassis management controller 125.

In some embodiments, the operations of a chassis management controller 125 may be implemented by one of the compute sled or storage sled remote access controllers 110*a-n*, 120*a-n* that has been designated and configured for managing chassis-level configurations. In some embodiments, chassis management controller 125 may receive telemetry reports from one or more sensors 170 that are components of chassis 100, such as temperature sensors at various chassis locations that provide inlet and exhaust temperature measurements. In such embodiments, such chassis sensors 170 be configured to generate and report telemetry from which technical issues may be identified by chassis management controller 125. As described in additional detail below, chassis management controller 125 may be configured to report collected issue data to a repository for use in identifying resolutions to issues being encountered within a data center or group of data centers that are managed using the tools described herein. In some embodiments, the chassis management controller 125 may also maintain and report hardware capacity information for use in evaluating available resolutions to issues being encountered within chassis 100. For instance, chassis management controller 125 may maintain and report capacity information specifying the number of additional compute sleds 105*a-n*, storage sleds 115*a-n*, network controllers 140, power supply units 135 and/or JBOD storage drives 155 that may be added to chassis 100. Where such capacity is available for use in chassis 100, certain issues may be determined to be resolved as quickly as possible through addition of one or more of these hardware components.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein for use of collaborative filtering in identifying resolutions for issues occurring within the IHS. In some embodiments, IHS 200 may operate the described tool for management of the IHSs installed in the plurality of datacenters, where the tool includes capabilities by which an administrator may request a set of recommended resolutions to a specified issue occurring within the datacenter. It should be appreciated that although the embodiments described herein may describe an IHS that is a compute sled, server or similar computing component that may be deployed within a rack-mounted chassis, other embodiments may be utilized with other types of IHSs. In the illustrative embodiment of FIG. 2, IHS 200 may be a computing component, such as compute sled 105*a-n*, that is configured to share infrastructure resources provided by a chassis 100. In some embodiments, IHS 200 may be a server, such as a 1RU (Rack Unit) server, that is installed within a slot of a chassis, such as a 2RU chassis, with another 1RU IHS server installed in the other slot of the chassis.

The IHS 200 of FIG. 2 may be a compute sled, such as compute sleds 105*a-n* of FIG. 1, that may be installed within a chassis, that may in turn be installed within a rack. Installed in this manner, IHS 200 may utilized shared power, network and cooling resources provided by the chassis and/or rack. IHS 200 may utilize one or more processors 205. In some embodiments, processors 205 may include a main processor and a co-processor, each of which may include a plurality of processing cores that, in certain scenarios, may be used in operating multiple virtualized computing environments. In certain embodiments, one or all of processor(s) 205 may be graphics processing units (GPUs) in scenarios where IHS 200 has been configured to support functions such as multimedia services and graphics applications.

In some embodiments, processor 205 may be configured to operate as a source of telemetry data providing physical sensor data, such as junction temperatures and power consumption. Processor 205 may also be configured to operate as a source logical telemetry data, such as remaining CPU processing capacity. In some embodiments, processor 205 may be configured by remote access controller 255 to generate telemetry data that is reported to the remote access controller, where the configuration and reporting of this telemetry data may be via a PECI (Platform Environment Control Interface) bus 285 operations. Processor 205 may be configured to generate and report such telemetry data from which remote access controller 255 may identify technical issues that are reported to an issue repository for use in identifying resolutions to issues in IHS 200, or in other IHSs that may be located in the same or different data center as IHS 200.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 200 via a high-speed memory interface 205b. In some embodiments, memory controller 205a may be configured to operate as a source of telemetry data capable of generating reports that are reported to remote access controller 255. The telemetry data reported by memory controller 205a may include metrics such as the amount of available system memory 210 and memory transfer rates via memory interface 205b. From the telemetry reported by memory controller 205a, remote access controller 255 may identify technical issues that are reported for use in identifying resolutions to issues in IHS 200 or in other IHSs.

The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory. In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a specific type of removable memory module 210a-n, such as a DIMM (Dual In-line Memory Module), that can be coupled to the socket and then decoupled from the socket as needed, such as to upgrade memory capabilities or to replace faulty components. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more buses 215. Various embodiments may utilize any number of buses to provide the illustrated pathways served by bus 215. In certain embodiments, bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources or other peripheral components.

In certain embodiments, a graphics processor 235 may be comprised within one or more video or graphics cards, or an embedded controller, installed as components of the IHS 200. In certain embodiments, graphics processor 235 may be an integrated of the remote access controller 255 and may be utilized to support the display of diagnostic and administrative interfaces related to IHS 200 via display devices that are coupled, either directly or remotely, to remote access controller 255.

In the illustrated embodiments, processor(s) 205 is coupled to a network controller 225, such as provided by a Network Interface Controller (NIC) that is coupled to the IHS 200 and allows the IHS 200 to communicate via an external network, such as the Internet or a LAN. As illustrated, network controller 225 may be instrumented with a controller or other logic unit 225a that supports a sideband management connection 275b with remote access controller 255. Via the sideband management connection 275b, network controller 225 may be configured to operate as a source of telemetry data that may include environmental metrics, such as temperature measurements, and logical sensors, such as metrics reporting input and output data transfer rates. From the telemetry reported by network controller 225, remote access controller 255 may identify technical issues that are reported for use in identifying resolutions to issues in IHS 200 or in other IHSs.

Processor(s) 205 may also be coupled to a power management unit 260 that may interface with the power system unit 135 of the chassis 100 in which IHS 200 may be installed. As with network controller 225, power management unit 260 may be instrumented with a controller or other logic unit 260a that supports a sideband management connection 275e with remote access controller 255. Via the sideband management connection 275e, power management unit 255 may be configured to operate as a source of telemetry data that may include physical sensors, such as a sensors providing temperature measurements and sensors providing power output measurements, and logical sensors, such as capabilities reporting discrete power settings. From the telemetry reported by, power management unit 255, remote access controller 255 may identify technical issues that are reported for use in identifying resolutions to issues in IHS 200 or in other IHSs.

As illustrated, IHS 200 may include one or more FPGA (Field-Programmable Gate Array) card(s) 220. Each FPGA card 220 supported by IHS 200 may include various processing and memory resources, in addition to an FPGA integrated circuit that may be reconfigured after deployment of IHS 200 through programming functions supported by the FPGA card 220. FGPA card 220 may be optimized to perform specific processing tasks, such as specific signal processing, security, data mining, and artificial intelligence functions, and/or to support specific hardware coupled to IHS 200. FPGA card 220 may include one or more physical and/or logical sensors. As specialized computing components, FPGA cards may be used to support large-scale computational tasks that may result in the FPGA card 220 generating significant amounts of heat. In order to protect specialized FPGA cards from damaging levels of heat, FPGA card 220 may be outfitted with multiple temperature sensors. FPGA card 220 may also include logical sensors that are sources of metric data, such as metrics reporting numbers of calculations performed by the programmed circuitry of the FPGA. The FPGA card 220 may also include a management controller 220a that may support interoperation was the remote access controller 255 via a sideband device management bus 275a. The management controller 220a of FPGA card 220 may be configured to generate and report telemetry data from which remote access controller 255 may identify technical issues that are reported for use in identifying resolutions to issues in IHS 200 or in other IHSs.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255.

IHS 200 may include one or more storage controllers 230 that may be utilized to access storage drives 240a-n that are accessible via the chassis in which IHS 100 is installed. Storage controller 230 may provide support for RAID (Redundant Array of Independent Disks) configurations of logical and physical storage drives 240a-n. In some embodiments, storage controller 230 may be an HBA (Host Bus Adapter) that provides more limited capabilities in accessing physical storage drives 240a-n. In some embodiments, storage drives 240a-n may be replaceable, hot-swappable storage devices that are installed within bays provided by the chassis in which IHS 200 is installed. In some embodiments, storage drives 240a-n may also be accessed by other IHSs that are also installed within the same chassis as IHS 100. In embodiments where storage drives 240a-n are hot-swappable devices that are received by bays of chassis, the storage drives 240a-n may be coupled to IHS 200 via couplings between the bays of the chassis and a midplane of IHS 200. Storage drives 240a-n may include SAS (Serial Attached SCSI) magnetic disk drives, SATA (Serial Advanced Technology Attachment) magnetic disk drives, solid-state drives (SSDs) and other types of storage drives in various combinations.

As illustrated, storage controller 230 may be instrumented with a controller or other logic unit 230a that supports a sideband management connection 275c with remote access controller 255. Via the sideband management connection 275c, storage controller 230 may be configured to operate as a source of telemetry data regarding the operation of storage drives 240a-n. For instance, controller 230a may collect metric data characterizing the performance of individual storage drives 240a-n, such as available storage capacity and data transfer rates, as well as environmental properties, such as storage drive temperatures. A controller or other logic unit 230a of storage controller 230 may be configured to generate telemetry data from which remote access controller 255 may identify technical issues that are reported for use in identifying resolutions to issues in IHS 200 or in other IHSs.

In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the IHS 200 (i.e., in a bare-metal state).

In some embodiments, remote access controller 255 may also be directly coupled via I2C couplings 275d with one or more sensors 280, such as sensors that provide measurements of ambient inlet temperatures, outlet airflow temperatures and temperatures at various locations within IHS 200. Sensors 280 coupled directly to remote access controller 255 may also be used in implementing security protocols, such as intrusion detection sensors and user proximity sensors. Sensors 280 may include logic units or other controllers 280a that are be configured by remote access controller 255 to generate and report telemetry data, where the remote access controller 255 may identify technical issues that are reported for use in identifying resolutions to issues in IHS 200 or in other IHSs.

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various managed devices 220, 225, 230, 260, 280 of an IHS via a sideband bus interface. For instance, messages utilized in device management may be transmitted using I2C sideband bus connections 275a-e that may be individually established with each of the respective managed devices 220, 225, 230, 260, 280 through the operation of an I2C multiplexer 255d of the remote access controller. As illustrated, certain of the managed devices of IHS 200, such as FPGA cards 220, network controller 225, storage controller 230 and power management unit 260, are coupled to the IHS processor(s) 205 via an in-line bus 215, such as a PCIe root complex, that is separate from the I2C sideband bus connections 275a-e used for device management.

In certain embodiments, the service processor 255a of remote access controller 255 may rely on an I2C co-processor 255b to implement sideband I2C communications between the remote access controller 255 and managed components 220, 225, 230, 260, 280 of the IHS. The I2C co-processor 255b may be a specialized co-processor or micro-controller that is configured to interface via a sideband I2C bus interface with the managed hardware components 220, 225, 230, 260, 280 of IHS. In some embodiments, the I2C co-processor 255b may be an integrated component of the service processor 255a, such as a peripheral system-on-chip feature that may be provided by the service processor 255a. Each I2C bus 275a-e is illustrated as single line in FIG. 2. However, each I2C bus 275a-e may be comprised of a clock line and data line that couple the remote access controller 255 to I2C endpoints 220a, 225a, 230a, 260a, 280a on each of the managed components.

As illustrated, the I2C co-processor 255b may interface with the individual managed devices 220, 225, 230, 260, 280 via individual sideband I2C buses 275a-e selected through the operation of an I2C multiplexer 255d. Via switching operations by the I2C multiplexer 255d, a sideband bus connection 275a-e may be established by a direct coupling between the I2C co-processor 255b and an individual managed device 220, 225, 230, 260, 280. In providing sideband management capabilities, the I2C co-processor 255b may each interoperate with corresponding endpoint I2C controllers 220a, 225a, 230a, 260a, 280a that implement the I2C communications of the respective managed devices 220, 225, 230, 260, 280. The endpoint I2C controllers 220a, 225a, 230a, 260a, 280a may be implemented as dedicated microcontrollers for communicating sideband I2C messages with the remote access controller 255, or endpoint I2C controllers 220a, 225a, 230a, 260a, 280a may be integrated SoC functions of a processor of the respective managed device endpoints 220, 225, 230, 260, 280.

In some embodiments, remote access controller 255 may utilizes sideband management connections 275a-e in detecting various type of events, such as error conditions, and collecting telemetry data from managed devices 220, 225, 230, 260, 280. For instance, remote access controller 255 may detect error condition signals and telemetry transmitted by managed devices 220, 225, 230, 260, 280 via the sideband connections 275a-e. As described in additional detail below, remote access controller 255 may be configured to report issues identified in this telemetry data for use in identifying resolutions to issues being encountered within a data center, or within a group of data centers that are managed using the tools described herein. In some embodiments, the remote access controller 255 may also maintain and report hardware capacity information for use in evaluating available resolutions to issues being encountered within IHS 200. For instance, remote access controller 255 may maintain and report capacity information specifying the number of additional memory modules 210a-n, storage drives 240a-n, network controllers 225, power supply units 260, storage controllers 230, processors 205 and/or FPGA cards 220 that may be added to IHS 200. Where such capacity is available for use in IHS 300, certain issues may be determined to be resolved as quickly as possible through addition of one or more of these hardware components.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
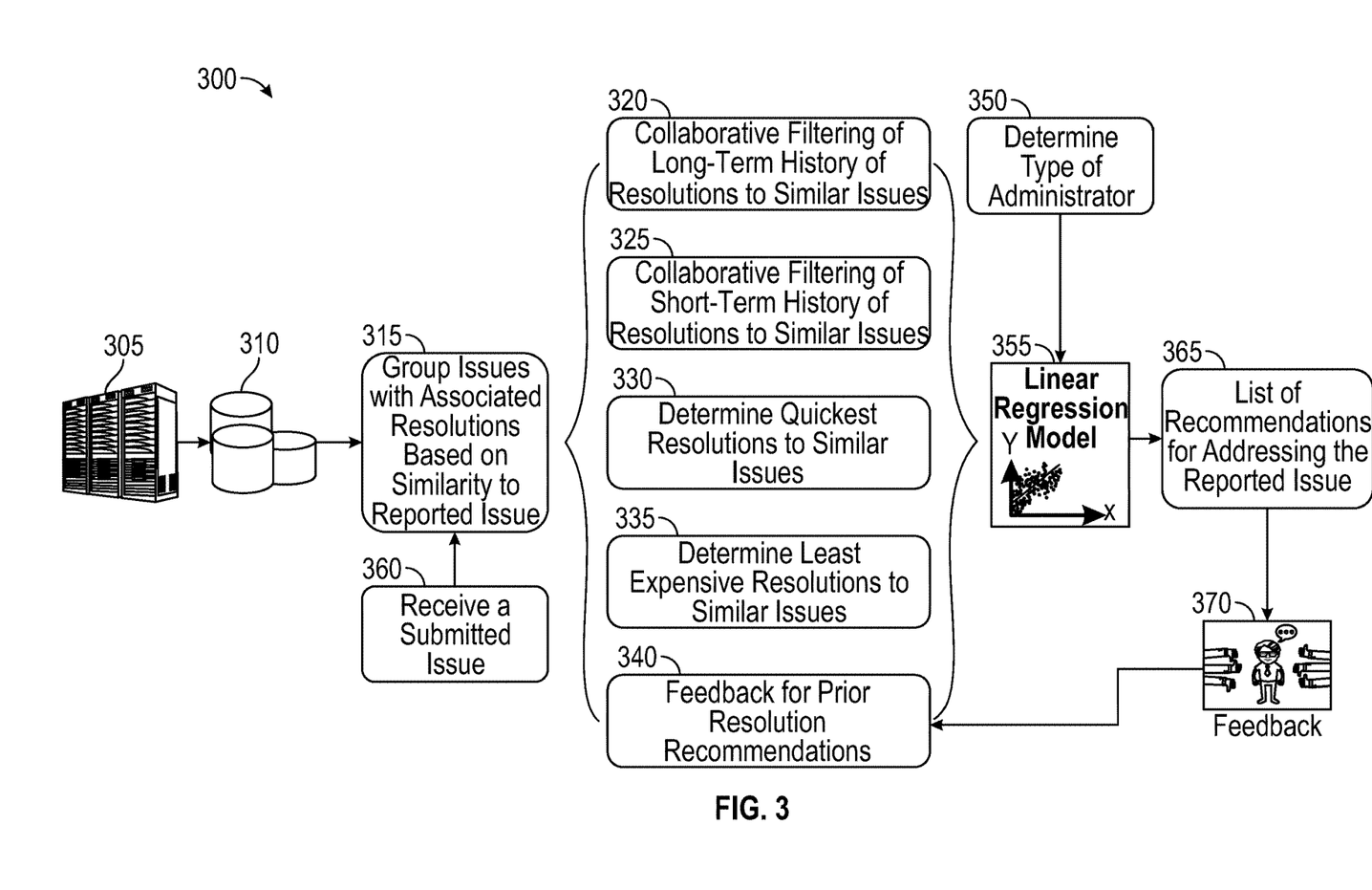
FIG. 3 is a diagram illustrating certain components of a system configured, according to some embodiments, for use of collaborative filtering in identifying resolutions for issues occurring within a datacenter.

FIG. 3 is a diagram illustrating certain components of a system 300 configured, according to some embodiments, for use of collaborative filtering in identifying resolutions for issues occurring within a datacenter. As described, a datacenter may be comprised of large numbers of racks that may each house one or more servers, networking components, power supplies, cooling systems and/or other specialized components. As described with regard to FIGS. 1 and 2, chassis 100 and IHS 200 embodiments that are installed within a datacenter 305 may be instrumented with capabilities for collecting various types of telemetry data. In some instances, such telemetry data may include reports of various types of identified issues within a chassis and/or IHS, such as error conditions, warning messages, system health alerts, and status alerts. As described, such technical issues identified within telemetry data may be collected and reported by a component of a chassis and/or IHS, such as by a chassis management controller and/or remote access controller.

As indicated in FIG. 3, such technical issues generated within data center 305 may be reported to an issue repository 310 that may be a data store or database that is maintained within the data center or at another location. As described in additional detail below, the reported issues may be stored in repository 310 in a format that supports matching of these stored issues with a specific issue that is submitted, at block 360, by an administrator, utilizing an administrative tool that implements the described embodiments and includes capabilities by which an administrator may request a set of recommended resolutions to a specified issue. Accordingly, upon an administrator submitting an issue for recommended resolutions, at block 315, the system 300 evaluates the submitted information in order to identify similar issues that have been reported and stored in repository 310.

Throughout the ongoing operation of system 300, issues reported within data center 305 are stored to repository 310. As described in additional detail below, as the system 300 generates recommended resolutions to submitted issues, the issues stored in repository 310 may be annotated with various types of information, including the recommended resolutions to the issue that are generated by system 300, and also including information specifying actual resolutions associated with the issue, such as administrator feedback based on acceptance or rejection of a recommended resolution. Accordingly, at block 315, the issue submitted for recommended resolutions by the administrator is compared for similarity with stored issues in repository 310, and in particular for similarity with stored issues that are associated with prior recommendations and feedback information.

As system 300 is utilized over time, the number of issues in repository 310 that are associated with recommendations and feedback information will increase as administrators provide feedback to the resolution recommendations that are generated by the system. In some embodiments, the issues in repository 310 with associated recommendation and/or feedback information that have a requisite level of similarity with the submitted issue 360 will be evaluated further in the generation of a recommended resolutions submitted issue. As illustrated, the evaluation of these similar issues may be conducted through a multi-part analysis, such as the illustrated five-part analysis, where each part 320, 325, 330, 335, 340 of the analysis generates a ranked listing of recommended resolutions to the submitted issue 360. Although the parts of the multi-part analysis are illustrated in parallel, in various embodiments, each of the parts 320, 325, 330, 335, 340 of the analysis may be conducted in series or parallel to some all of the other parts of the analysis.

In the illustrated embodiment, the first portion 320 of the analysis includes collaborative filtering of the similar issues identified in repository 310 that have recommendation information, where a longer-term selection of the similar issues is considered in the collaborative filtering. For instance, the similar issues considered in the collaborative filtering of 320 may include all similar issues that are identified in the repository, with no restrictions on when the similar issues occurred. In other instances, only similar issues stored to the repository 310, or that have been annotated with recommendation information, within the last year may be evaluated in the collaborative filtering 320. The output of the collaborative filtering of the long-term history of similar issues may consist of a ranked list of the considered similar issues, where the highest ranked issue resolution in this output has been identified as the most similar to the submitted issue 360 based on collaborative filtering of the recommendations and feedback for the issues in the long-term data.

As illustrated, the second portion 325 of the analysis includes collaborative filtering of similar issues in repository 310 that have associated recommendation information, where a shorter-term selection of the similar issues is considered. For instance, the similar issues considered in the collaborative filtering 325 may include all similar issues that were stored in the repository 310, or include other activity such as recommendation annotations, within the last week. As with the long-term analysis of 320, the output of the collaborative filtering of the short-term history of similar issues also consists of a ranked list of the considered similar issues, where the highest ranked issue resolution in this output has been identified as the most similar to the submitted issue 360 based on collaborative filtering of the of the recommendations and feedback in the short-term data.

In existing systems, collaborative filtering is typically utilized to identify recommendations for items or individuals that are similar to a target item or individual. For instance, collaborative filtering may be utilized to provide an individual with movie recommendations based on filtering of recommendations made by other individuals that have demonstrated similar movie preferences to the individual. In this same manner, existing systems utilize collaborative filtering to provide a target individual with recommendations for social media connections with other individuals that have demonstrated similar preferences to the target individual. Embodiments, however, instead utilize collaborative filtering to identify recommendations to a reported issue based on demonstrated similarity of the reported issue to previously reported issues that are associated with resolution information.

Through separate evaluation of longer-term data and shorter-term data, embodiments support separate consideration for more recent issue resolutions, which are most likely to be relevant to a submitted issue 360, even when the number of recent issue resolutions are much fewer than the number of older resolutions. As such, separate evaluation of long-term and short-term data prevents a small number of recent resolutions from being overwhelmed in the analysis by a potentially large number resolutions in the longer-term data. For instance, if a single collaborative filtering analysis were conducted on all similar issues identified in repository 310 without regard to the timing of these issues, a handful of very recent resolutions to similar issues would be potentially lost within a history of resolutions to similar issues that could number in the hundreds. Accordingly, embodiments utilize independent collaborative filtering for long-term and short-term issue resolution recommendations.

In the illustrated embodiment, the third part 330 of the multi-part analysis determines the quickest possible resolutions to the submitted issue 360. In some instances, a quick resolution to the submitted issue may be preferable, such as when administrative resources required to implement inexpensive resolutions are unavailable, and such as in scenarios where addressing the submitted issue is time critical. Accordingly, embodiments may generate a listing of quickest possible resolutions to the submitted issue 360, where the list may be ranked with the quickest possible resolution ranked first. Some embodiments may utilize tables that provide possible resolutions to certain types of issues, where these resolutions may involve adding new hardware components to the chassis or IHS from which the submitted issue 360 originates. As described with regard to FIGS. 1 and 2, chassis management controllers and remote access controllers according to embodiments may track available capacity within a chassis and/or IHS, in particular capacity for components such as memory, storage drives, network controllers, processors etc. In some embodiments, such available capacity information may be used in evaluating the resolutions provided in the tables in generating a list of the quickest possible resolutions and in specifying the location of the hardware component to be replaced, or the location where a hardware component can be added.

In the illustrated embodiment, the fourth part 335 of the analysis determines the least expensive possible resolutions to the submitted issue 360. In some instances, an inexpensive resolution to the submitted issue may be preferable, such as such as when budgets are constrained, when needed hardware components are not available, and when abundant administrative resources are available to implement laborious, but otherwise inexpensive resolutions. Accordingly, embodiments may generate a listing of the least expensive possible resolutions to the submitted issue 360, where the list may be ranked with the least expensive possible resolution ranked first. As above, some embodiments may utilize tables that provide possible resolutions to certain types of issues, where these resolutions may involve manual administration of hardware or software of the IHS or chassis from which the submitted issue 360 originates. For instance, an issue classified as a disk capacity issue may be associated with a recommended resolution involving the deletion of data from one or more storage drives, which may resolve the issue inexpensively, but may require an administrator manually selecting data for deletion or offloading to another storage. In other instances, an issue classified as a performance issue may be associated with a recommended resolution involving moving a processing workload to a different IHS or to a different processor core. This again provides an inexpensive solution compared to adding or upgrading the processing resources of an IHS. In other instances, an issue classified as a data availability issue may be associated with a recommended resolution involving adjusting the allocation of available networking resource, such as allocation of network channels that are dedicated to a processor or processor core. This also provides an inexpensive resolution compared to adding or upgrading networking component to add addition network bandwidth, but may require significant administrative resources, especially if the reallocation of network channels results in new network bandwidth constraints.

The fifth part 340 of the analysis specifies a listing of any resolutions to similar issues for which an administrative user has provided feedback, whether the feedback is positive or negative. Such a listing may be ranked based on the similarity of the issues to the reported issue 360 and/or based on the feedback provided by the administrative user, such as whether the recommended resolution was confirmed to correct the issue, or whether the recommended resolution provide some improvement, but did not fully address issue. As indicated in FIG. 3, such administrator feedback 370 that is provided in response to each set of recommendations generated by system 300 is then used in improving the recommendations that are provided by the system.

As illustrated, a list 365 of recommended resolutions for addressing the submitted issue 360 may be generated through use of a linear regression model 355 that utilizes the ranked set of resolutions provided through each of the five parts 320, 325, 330, 335 340 of the analysis as independent variable inputs. Through application of the regression model 355, a ranked listing of recommended resolutions is generated from the combined information provided in the five lists of recommendations utilized as independent variable inputs. In some embodiments, the linear regression model 355 maybe tuned to generate results that are biased in various manners, such as through selection of coefficients used for each of the ranked list inputs that are utilized as independent variables by the linear regression.

For instance, the type of administrator 350 for which the recommendations are being provided may be utilized as an input to the linear regression model and used to bias the output of the model to favor certain types of recommendations. For example, in a scenario where an administrator has limited resources with regards to time that can be devoted to implementing a resolution, but the administrator has resources that allow adding hardware components to the system, the linear regression model 355 can be biased through selection of coefficients towards selecting the quickest recommended resolutions to the submitted issue 360. In the same manner, the linear regression model 355 can be biased towards selecting inexpensive possible resolutions for an administrator that is constrained with regard to adding hardware to a system.

The output of the linear regression model 355 may be provided to the administrator as a ranked list of recommended resolutions to the submitted issue 360. The administrator may then select from the provided recommendations. In some instances, the administrator may utilize user interface capabilities for specifically declining some or all of the provided recommendations, thus establishing negative feedback 370 for those particular recommendation to the submitted issue 360, and also for any other issues later determined to be similar to the submitted issue 360. In some instances, the administrator may specifically accept one or more of the provided recommendations, thus establishing positive feedback 370 for that particular recommendation to the submitted issue 360, and also for future issues determined to be similar to the submitted issue. In some instances, the administrator may also provide feedback specifying whether implementing the accepted recommendation fully or partially addressed the submitted issue 360.

Figure 4:
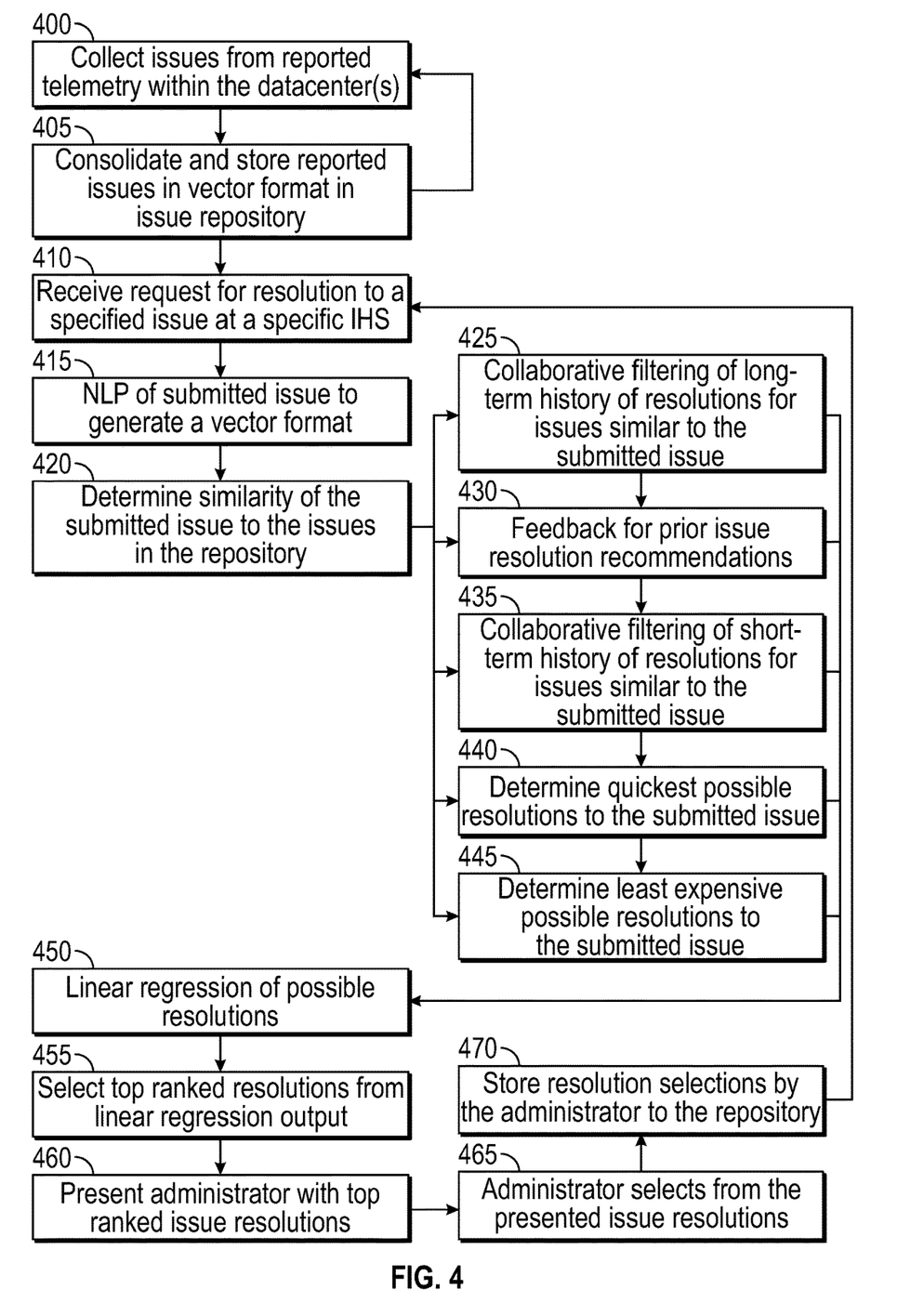
FIG. 4 is a flowchart describing certain steps of a method, according to some embodiments, for use of collaborative filtering in identifying resolutions for issues occurring within a datacenter.

FIG. 4 is a flowchart describing certain steps of a method, according to some embodiments, for use of collaborative filtering in identifying resolutions for issues occurring within a datacenter. Some embodiments may begin, at 400, with the collection of issues identified within telemetry reported by a chassis and/or IHS. As described, the collected issues, such as error conditions and health alerts, may be reported from various hardware components of IHS and/or chassis. For instance, a storage controller or a software program of an IHS may report a storage capacity issue, such as an actual or predicted shortage of capacity in a data store supported by the IHS. At 405, the collected issue data is consolidated and stored in an issue repository. In some embodiments, the collected issues may each be processed to generate a vector format representation of the issue, such as a vector that represents the occurrence of certain keywords and conditions within the information by which the issue is reported. As indicated in FIG. 4, the described collecting and processing of issues for storage in a vector format may continue on an ongoing basis throughout the operation of embodiments.

In addition to collecting and storing issues in the issue repository, embodiments also provide an administrative tool by which an administrator may submit a request for recommended resolutions to an issue occurring within an IHS or chassis in a data center. Accordingly, at 410, such an administrative tool may receive a request for recommended resolutions to a specified issue occurring within a specified IHS and/or chassis. In some instances, the issue may be specified by the administrator in the form of a message that has been presented to the administrator, such as an error message that is displayed in a management console operated by the administrator. In other instances, the submitted issued may be a message that is retrieved by the administrator, such as information retrieved by the administrator from a log file. In other instances, the issue may be specified by the administrator through text entry and/or user interface selections provided by the administrative tool.

At 415, the submitted issue may be processed in order to generate a vectorized format for the issue. For instance, natural language processing techniques may be utilized to convert the submitted issue information into a simplified form, such as identification of root words, and through the identification keywords that can be used in classifying the issue. From the root words and keywords that result from the natural language processing of the submitted issue, a vectorized format for the submitted issue may be generated. As described with regard to FIG. 3, the collected issues that are stored in the issue repository may likewise be processed and stored in a vectorized format. Also as described, the stored issues may be associated with recommendations and various types of feedback that are also stored in the issue repository.

Accordingly, at 420, embodiments may continue by identifying issues in the issue repository that are associated with prior recommendations and that are similar to the submitted issue, where similarity may be determined based on comparisons of the vector format representations of the issues stored in repository and of the submitted issue. In some embodiments, a metric of similarity between the submitted issue and an issue stored in repository may be generated by calculating a cosine similarity between the vector representations of the two issues. In some embodiments, issues in the repository with a cosine similarity greater than some threshold may be deemed to be similar to the submitted issue. In some embodiments, a certain number of issues in the repository with the greatest similarity to the submitted issued may be deemed as the issues in the repository that are similar to the submitted issue. Other embodiments may utilize other metrics in these same manners for measuring similarity in identifying issues in the repository that are similar to the submitted issue.

As illustrated in FIG. 4, the issues identified as similar to the submitted issue may be processed through a five-part analysis, where each part of the analysis generates a ranked listing of some or all of the similar issues identified at 420. In FIG. 4, the separate parts of the analysis are illustrated in parallel, but other embodiments may implement some or all of the parts of the analysis in series. Some embodiments may use only some of the parts of the analysis provided in FIG. 4 and some embodiments may use additional types of analysis not included in FIG. 4.

In one part of the analysis of the illustrated embodiment, at 425, the issues similar to the submitted issue are ranked utilizing a collaborative filtering algorithm, where the similar issues that are considered in the collaborative filtering are issued from a long-term timeframe, such as within the last year or within the last six months. As described above, separately evaluating long-term versus short-term issue reports using collaborative filtering allows embodiments to identify promising resolution recommendations occurring in recent data, but that are still relatively few in number compared to the greater number of recommendations that may be available over a longer-term timeframe. The analysis at 425 of a long-term history of similar issues thus generates a ranked set of recommendations that are associated with issues that are similar to the submitted issue, and that may date as far back as initial use of a system configured as described herein.

At 435, collaborative filtering is used to generate an additional ranked listing of issues similar to the submitted issue, where the considered issues are limited to those in a short-term or recent timeframe, such as within the last week. Separately evaluating recent issues allows emerging information to be considered separately and provides the ability for recent issues to hold similar or greater weight than older issues that may be much larger in number. As illustrated, at 430, an additional ranked listing may be generated from the similar issues that have been annotated with recommendation information associated with administrator feedback, where the ranking may be based on the type and degree of feedback provided by the administrator. For instance, a similar issue with an associated recommendation that has affirmative feedback specifying that an administrator utilized the recommendation to resolve the issue may be ranked higher than an issue recommendation that has affirmative feedback, but does not specify that the issue was resolved.

As described above, embodiments may also provide recommendations that are biased towards generated certain types of recommendations. For instance, at 440, a ranked listing of the quickest possible resolutions to the submitted issue, or to similar issues, is generated. As described, such list of quickest possible resolutions may be generated based on predefined tables that specify a list of possible solutions to an issue, where the tables may provide information regarding the administrative time and/or downtime required to implement each of the recommended resolutions. Also as described, in some embodiments, the IHS and/or chassis form which the submitted issued originates may be queried in order to determine whether there is capacity for additional hardware that would provide resources by which the submitted issued can be addressed.

As illustrated, at 445, a ranked listing of the most inexpensive possible resolutions to the submitted issue, or similar issues, is generated. Such a ranked listing of the most inexpensive resolutions may be generated from the same table or from a different table used to generate the ranked listing of the quickest resolutions. In some embodiments, the expense of a resolution to the submitted issued may be characterized based on whether additional hardware is required, expected downtime to implement the recommendation and/or the expected amount of time required for an administrator to implement the recommendation.

Based on the ranked listing generated by each part of the analysis, at 450, a linear regression is applied in order to generate a single ranked list of recommended resolutions to the submitted issue. At 455, a selected number of the top-ranked issue recommendations from the linear regression output are identified. At 460, these top ranked recommendations to similar issues are then provided to the administrator as recommended resolutions to the submitted issue, such as via a user interface of the described administrative tool. At 465, the administrator reviews the recommendations and may select from the ranked list through interfaces provided by the administrative tool. In some embodiments, the administrator may be provided with capabilities for expressly declining specific recommendations in the ranked list, including providing a rationale declining the recommendation. In some embodiments the administrator may be provided with capabilities for accepting one or more of the recommendations that are provided in the ranked list. In such embodiments, the administrator may be further provided with capabilities for signaling when the accepted recommendation has been implemented, and may also be provided with capabilities for providing specific feedback regarding the outcome of implementing the recommendation, such as whether the issue was fully or partially addressed. At 470, any feedback information provided by the administrator, or any feedback that can be inferred from the administrator's actions, may be utilized to update the issue repository, where such feedback is associated with the recommendations to the submitted issue and with some or all of the issues in the repository determined to be similar to the submitted issue.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method comprising:
receiving a report of an issue occurring during operation of an Information Handling System (IHS);
identifying similar issues to the reported issue within a repository of stored issues reported by IHSs installed in a plurality of datacenters, wherein the identified similar issues are each associated with resolution information specifying one or more recommended resolutions;
utilizing collaborative filtering on the similar issues and associated resolution information to generate a first ranked list of the similar issues and associated resolution information;
utilizing collaborative filtering on a subset of the similar issues and associated resolution information to generate a second ranked list of the subset of similar issues and associated resolution information, wherein the subset of similar issues are each selected based on being within a time proximity to the reported issue;
utilizing a linear regression on the first ranked list and the second ranked list to generate a ranked list of recommended resolutions to the reported issue;
providing the ranked list of recommended resolutions to a first administrator; and
resolving the reported issue utilizing one or more recommended resolutions selected by the first administrator from the ranked list of recommended resolutions.

2. The method of claim 1, wherein the similar issues are identified based on a similarity between a vectorized representation of the reported issue and vectorized representations of issues stored in the repository.

3. The method of claim 2, wherein the similarity to the reported issues is identified based on a cosine similarity between the vectorized representations.

4. The method of claim 1, wherein the resolution information specifying one or more recommended resolutions comprises feedback received from a second administrator pertaining to a recommended resolution.

5. The method of claim 4, wherein the feedback specifies whether the recommended resolution was accepted or rejected by the second administrator.

6. The method of claim 1, further comprising generating a third ranked list of the similar issues and associated resolution information, wherein the third ranked list specifies an ordered list of quickest resolutions to the reported issue, and wherein the linear regression further utilizes the third ranked list to generate the ranked list of recommended resolutions to the reported issue.

7. The method of claim 1, further comprising generating a third ranked list of the similar issues and associated resolution information, wherein the third ranked list specifies an ordered list of least expensive resolutions to the reported issue, and wherein the linear regression further utilizes the third ranked list to generate the ranked list of recommended resolutions to the reported issue.

8. The method of claim 1, further comprising generating a third ranked list of the similar issues and associated resolution information, wherein the third ranked list specifies an ordered list that is ranked based on feedback provided by a second administrator.

9. The method of claim 1, wherein the first ranked list generated by collaborative filtering is ranked based on the resolution information specifying one or more recommended resolutions.

10. A system comprising:
a plurality of storage drives storing a repository of issues reported by Information Handling Systems (IHSs) installed in a plurality of datacenters; and
a non-transitory storage medium storing program instructions that are executed by a processor to operate an administrative software tool provided for management of the IHSs installed in the plurality of datacenters, wherein the tool is configured to:
receive a report of an issue occurring during operation of a first of the IHSs;
identify similar issues to the reported issue within the repository, wherein the identified similar issues are each associated with resolution information specifying one or more recommended resolutions;
utilize collaborative filtering on the similar issues and associated resolution information to generate a first ranked list of the similar issues and associated resolution information;
utilize collaborative filtering on a subset of the similar issues and associated resolution information to generate a second ranked list of the subset of similar issues and associated resolution information, wherein the subset of similar issues are each selected based on being within a time proximity to the reported issue;
utilize a linear regression on the first ranked list and the second ranked list to generate a ranked list of recommended resolutions to the reported issue;
provide the ranked list of recommended resolutions to a first administrator; and
resolve the reported issue, implementing one or more recommended resolutions selected by the first administrator from the ranked list of recommended resolutions.

11. The system of claim 10, wherein the similar issues are identified based on a similarity between a vectorized representation of the reported issue and vectorized representations of issues stored in the repository.

12. The system of claim 11, wherein the similarity to the reported issues is identified based on a cosine similarity between the vectorized representations.

13. The system of claim 10, wherein the resolution information specifying one or more recommended resolutions comprises feedback received from a second administrator pertaining to a recommended resolution.

14. The system of claim 13, wherein the feedback specifies whether the recommended resolution was accepted or rejected by the second administrator.

15. The system of claim 10, wherein the first ranked list generated by collaborative filtering is ranked based on the resolution information specifying one or more recommended resolutions.

16. A non-transitory computer-readable storage device having instructions stored thereon for management of the Information Handling Systems (IHSs) installed in the plurality of datacenters, wherein execution of the instructions by one or more processors causes the one or more processors to:

receive a report of an issue occurring during operation of a first of the IHSs;

identify similar issues to the reported issue within a repository of stored issues reported by the IHSs installed in a plurality of datacenters, wherein the identified similar issues are each associated with resolution information specifying one or more recommended resolutions;

utilize collaborative filtering on the similar issues and associated resolution information to generate a first ranked list of the similar issues and associated resolution information;

utilize collaborative filtering on a subset of the similar issues and associated resolution information to generate a second ranked list of the subset of similar issues and associated resolution information, wherein the subset of similar issues are each selected based on being within a time proximity to the reported issue;

utilize a linear regression on the first ranked list and the second ranked list to generate a ranked list of recommended resolutions to the reported issue;

provide the ranked list of recommended resolutions to a first administrator; and resolve the reported issue, implementing one or more recommended resolutions selected by the first administrator from the ranked list of recommended resolutions.

17. The storage device of claim 16, wherein the similar issues are identified based on a similarity between a vectorized representation of the reported issue and vectorized representations of issues stored in the repository.

18. The storage device of claim 17, wherein the similarity to the reported issues is identified based on a cosine similarity between the vectorized representations.

19. The storage device of claim 16, wherein the resolution information specifying one or more recommended resolutions comprises feedback received from a second administrator pertaining to a recommended resolution.

20. The storage device of claim 19, wherein the feedback specifies whether the recommended resolution was accepted or rejected by the second administrator.

* * * * *